United States Patent [19]
Moon

[11] Patent Number: 5,486,872
[45] Date of Patent: Jan. 23, 1996

[54] METHOD AND APPARATUS FOR COVERING AND REVEALING THE DISPLAY OF CAPTIONS

[75] Inventor: Si Young Moon, Inchon, Rep. of Korea

[73] Assignee: Samsung Electronics Co., Ltd., Kyungki-Do, Rep. of Korea

[21] Appl. No.: 269,094

[22] Filed: Jun. 30, 1994

Related U.S. Application Data

[63] Continuation-in-part of Ser. No. 23,676, Feb. 26, 1993, abandoned.

[51] Int. Cl.[6] .......................... H04N 5/262; H04N 5/278; H04N 5/445
[52] U.S. Cl. ...................... 348/564; 348/61; 348/552; 434/157
[58] Field of Search ...................... 348/564, 563, 348/565–567, 569, 552, 576, 589, 588, 584, 596, 600, 722, 571, 61, 478, 468, 473, 461, 460; 395/161, 154; 434/307 R, 156, 157, 169, 430, 318, 118; 364/419.01, 419.02, 419.16, 419.17; 345/118, 116; H04N 5/262, 5/265, 5/272, 5/278, 5/445

[56] References Cited

U.S. PATENT DOCUMENTS

| | | | |
|---|---|---|---|
| 3,891,792 | 6/1975 | Kimura | 358/183 |
| 4,498,098 | 2/1985 | Stell | 358/22 |
| 4,675,737 | 6/1987 | Fujino et al. | 358/183 |
| 4,734,036 | 3/1988 | Kasha | 434/157 |
| 4,968,257 | 11/1990 | Yalen | 434/308 |
| 5,273,433 | 12/1993 | Kaminski et al. | 434/157 |
| 5,299,006 | 3/1994 | Kim | 348/571 |

*Primary Examiner*—James J. Groody
*Assistant Examiner*—Safet Metjahic
*Attorney, Agent, or Firm*—Sughrue, Mion, Zinn, Macpeak & Seas

[57] ABSTRACT

A method for covering and revealing a translated caption in a video reproducing apparatus, which includes a key input circuit for operating control keys selected by a user, a microcomputer coupled to the key input circuit for controlling the apparatus in response to a selected key input, an OSD processor for processing OSD characters, a caption processor for generating a caption, a video signal output circuit for generating a composite video signal including the OSD characters, the caption, and a video signal, and a display for displaying an image corresponding to the composite video signal, includes steps for selecting and storing a start and end position corresponding to the orientation in which the translated caption is displayed, e.g., horizontally or vertically, and generating shadow characters for display between the start and end positions so as to cover the translated caption. Thus, the user can cause the translated caption to be selectively revealed. A video reproducing apparatus suitable for performing the translated caption covering method is also described.

6 Claims, 4 Drawing Sheets

METHOD AND APPARATUS FOR COVERING AND REVEALING THE DISPLAY OF CAPTIONS

This is a Continuation-In-Part of application Ser. No. 08/023,676 filed Feb. 26, 1993, abandoned.

BACKGROUND OF THE INVENTION

1. Field of the Invention

The present invention relates, in general, to a method for operating an video reproducing apparatus, such as a video cassette recorder ("VCR"), for improving the efficiency of learning a second language. More particularly, the present invention is directed to a method for covering and revealing a translated caption reproduced from a video signal and displayed on a video display. Advantageously, the method can be implemented using on screen display (hereinafter termed "OSD") characters. An apparatus for selectively clearly a translated caption included within a video signal is also disclosed.

Korean Patent Application No. 92-8502 is incorporated herein by reference for all purposes.

2. Description of Related Art

Methods of learning a foreign language are known. One such method includes the use of a VCR and video tape, which tape has recorded thereon illustrations and corresponding text in both a native language, i.e., a translated caption, and the foreign language, i.e., a caption. For example, when playing the video tape in the VCR of FIG. 1, the mountains and the corresponding caption "Mountain" are displayed on a display, as shown in FIG. 2.

Japanese Utility Model Publication No. 1-136961 discloses the VCR shown in FIG. 1, which includes a recording medium 1 having recorded thereon a picture (i.e., video) signal, various caption characters, and a sound (i.e., audio) signal, a reproducing circuit 2 for reproducing the picture and sound signals from the recording medium 1, switches 4 and 5 for selectively displaying a caption, i.e., characters corresponding to the sound signal recording in the tape, and a displaying circuit 3 for displaying the image and characters corresponding to the sound signal. During operation, the reproducing circuit 2 displays the characters in the selected language, as shown in FIG. 2, corresponding to the reproduction of the sound signal in accordance with the positioning of the switch 4. Thus, the efficiency of learning a language can be improved. However, in the reproducing circuit 2, the translated caption is displayed on a predetermined position on the screen in accordance with the positioning of the switch 4. This is inconvenient to the user when trying to learn the spoken characteristics of the language, i.e., the translated caption will distract the user.

Furthermore, in such systems, the translated caption is displayed over and covers the corresponding illustrations. This is inconvenient for the user and further reduces the learning efficiency. In addition, as the caption is displayed on a display circuit 3, sound signals corresponding to the caption are also reproduced through the audio system. Thus, the user can both see and hear the caption as it is reproduced. There is, however, a problem with this method in that the user becomes confused by seeing all or part of the translated caption as the audio portion is reproduced. Any confusion on the part of the user lowers the user's efficiency in learning a new language.

The present invention was motivated by a desire to overcome the problems enumerated above.

SUMMARY OF THE INVENTION

Accordingly, the principal object according to the present invention to provide a method for improving the efficiency of learning a foreign language and which overcomes the above problems and disadvantages of conventional systems.

A further object of the present invention is to provide an apparatus for improving the efficiency of learning a foreign language and which overcomes the above problems and disadvantages of conventional systems.

Another object of the preset invention is to provide a method for clearing the translated caption from the display by covering the translated caption using OSD characters so as to prevent the translated caption from being viewed as a corresponding sound is reproduced from the video tape.

These and other objects, features and advantages according to the present invention are provided by a method of selectively covering and displaying a translated caption for a video reproducing apparatus including a key input circuit for producing signals indicative of operation of an OSD shadow key, a point key and a point storing key, a microcomputer coupled to the key input circuit for controlling the video reproducing apparatus in response to selected key signals, an OSD processor coupled to the microcomputer for generating OSD characters in accordance with a first output of the microcomputer, a caption processor coupled to the microcomputer for generating a caption from a received video signal in accordance with a second output of the microcomputer, a video signal output circuit coupled to both the OSD processor and to the caption processor for generating a composite video signal including the OSD characters, an optional caption and an associated video signal, and a display for displaying an image corresponding to the composite video signal.

Advantageously, the method includes an initial routine including steps for:

placing the apparatus in an OSD shadow mode by selecting the OSD shadow key of the key input circuit;

determining whether the translated caption is displayed horizontally or vertically on the display; and setting a pointer at an initial position corresponding to whether the translated caption is displayed horizontally or vertically. Moreover, the inventive method includes a second routine, i.e., an OSD character output routine, including steps for:

selecting a start position and an end position using a point key; and displaying OSD characters between the selected start position and end position so as to cover the display of the translated caption.

These and other objects, features and advantages according to the present invention are provided by a method for covering and revealing a translated caption in a video reproducing apparatus including a display in which the video reproducing apparatus displays a caption and a translated caption on the display, the method including steps for:

determining whether the translated caption is displayed horizontally or vertically on the display;

selecting a start position and an end position on the display corresponding to whether the translated caption is displayed horizontally or vertically; and displaying shadow characters between the selected start position and end position so as to cover the display of the translated caption.

These and other objects, features and advantages of the invention are disclosed in or apparent from the following description of preferred embodiments.

BRIEF DESCRIPTION OF THE DRAWINGS

The present invention will become more apparent through the detail description of the preferred embodiments of the present invention when taking in conjunction with the attached drawings in which.

DETAILED DESCRIPTION OF THE PREFERRED EMBODIMENTS

Figure 3:
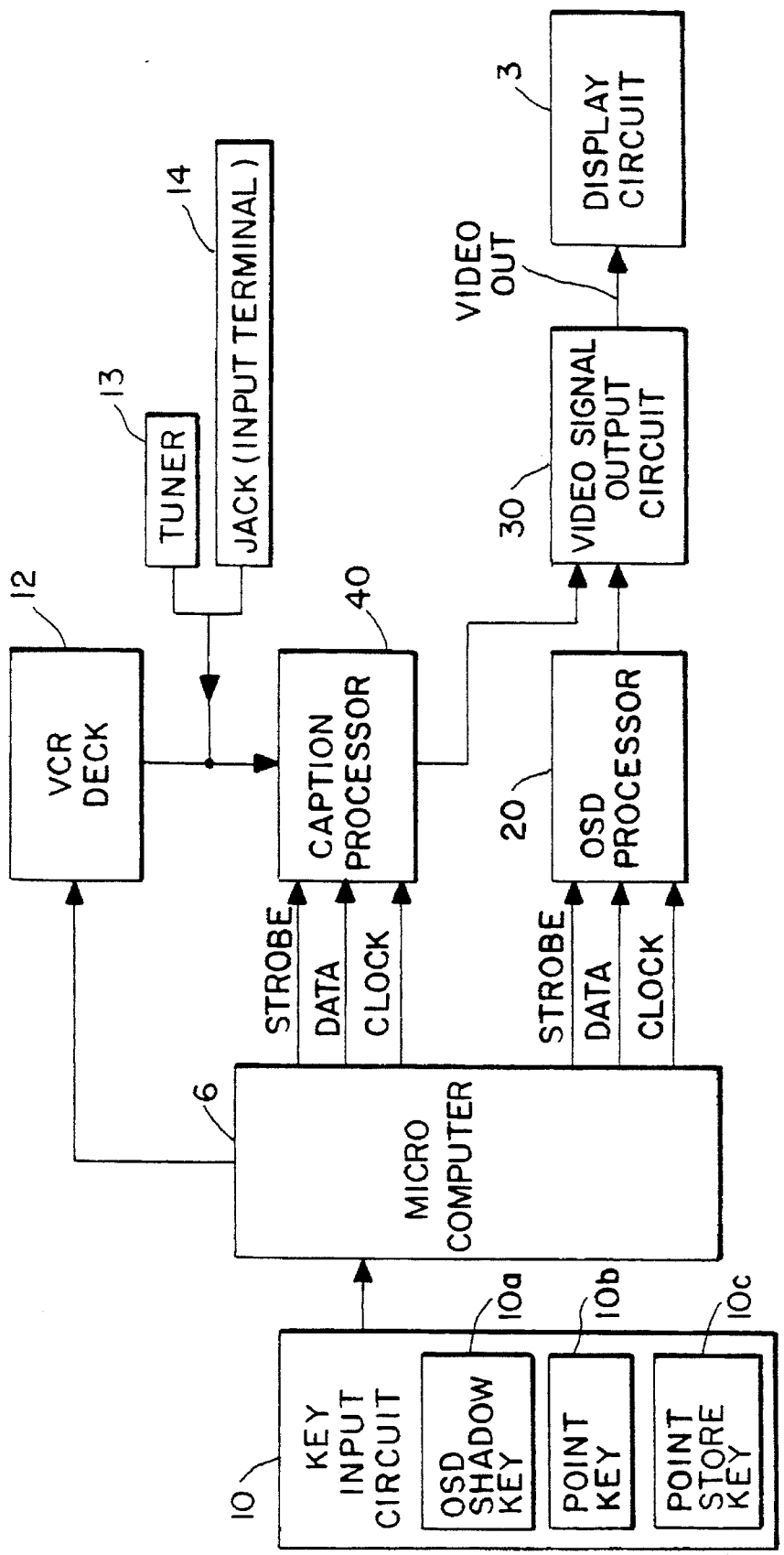
FIG. 3 is a high level block diagram illustrating an apparatus for selectively covering and revealing a translated caption according to the present invention.
Figure 5A:
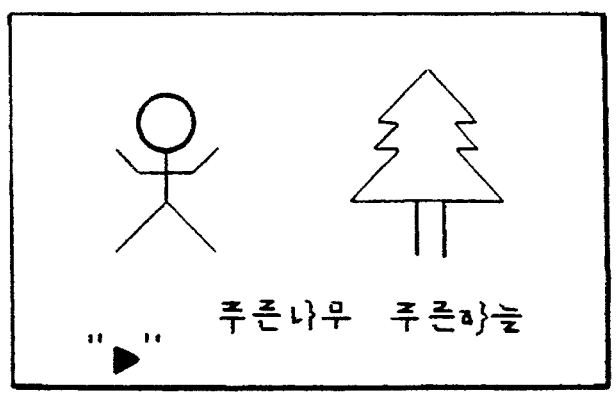
FIGS. 5A to 5C are illustrations which are helpful in understanding the method illustrated in FIG. 4.
Figure 5B:
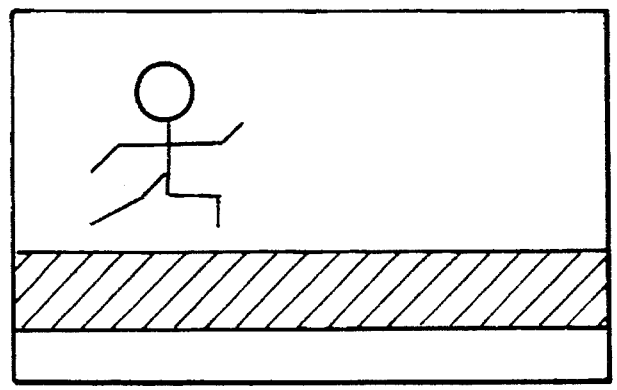
Figure 5C:
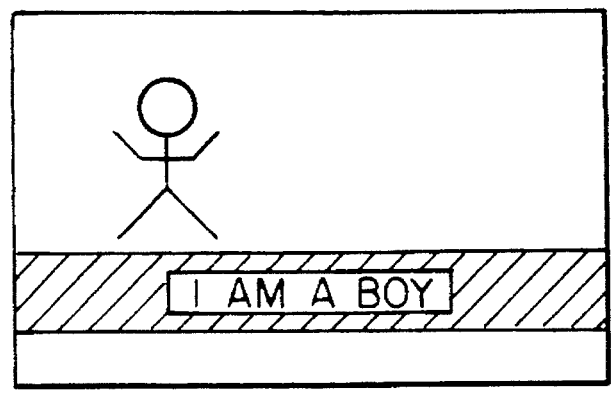

FIG. 3 is a high level block diagram of an apparatus for selectively clearing and revealing a translated caption from a video display according to the present invention. The apparatus includes a key input circuit 1 0, which is composed of a key matrix for receiving and providing key signals, a microcomputer 6, which receives input key signals from the key input circuit 10, for controlling the apparatus in response to the input key signals, an OSD processor 20, which is connected to the microcomputer 6, for providing OSD characters in response to strobe, data, and clock signals from the microcomputer 6, a caption processor receiving a video signal, which is connected to the microcomputer 6, for providing a caption in response to strobe, data, and clock signals from the microcomputer 6, and a video signal output circuit 30, which is coupled to the OSD processor 20 and to the caption processor 40, for generating a composite video signal VIDEO OUT including OSD characters, an optional caption, and an image signal included in the input video signal. The composite video signal is preferably supplied to a display 3 to produce images as shown in FIGS. 5A to 5C.

It will be appreciated that a remote controller and an associated receiver (not shown) can be connected to microprocessor 6 and advantageously can be used in providing key signals. Preferably, key matrix 10 includes an OSD shadow key 10a, a point key 10b and a point storing key 10c, the use of which will be described in greater detail below.

Figure 1:
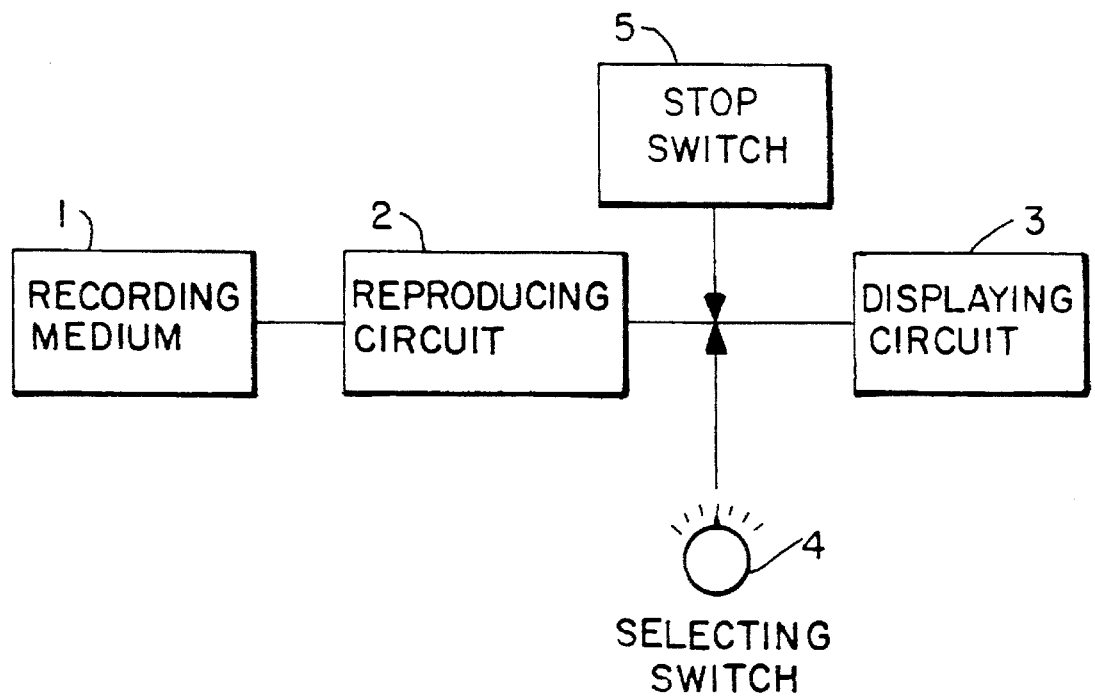
FIG. 1 is a high level block diagram illustrating a conventional recording medium used for learning a language.
Figure 2:
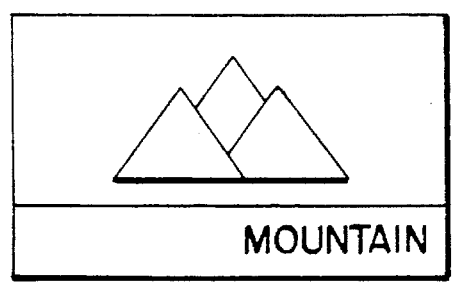
FIG. 2 shows a display of the information recorded on the conventional recording medium of FIG. 1.

In an exemplary case, the translated caption and caption can be individually stored for reproduction on the recording medium 1 shown in FIG. 1 and reproduced by a VCR deck 12 which advantageously can be controlled by microcomputer 6. However, the video signal supplied to caption processor 40 may be any one of the video signal reproduced by VCR deck 12, a radio frequency (RF) signal from a tuner 13 or a video signal from an external source supplied to a jack, i.e., input terminal, 14. One of these three signals is input to caption processor 40 and ultimately displayed on display circuit 3.

A familiar example of a recorded video tape which advantageously can be used with the method according to the present invention is a video tape which has been recorded and closed-captioned in a first language, i.e., the foreign language, and which has been dubbed by applying a translated caption, i.e., characters in the user's native language, over the video images. Thus, a translated caption and a caption can be selectively viewed as the corresponding sound portion is reproduced. If OSD characters are not to be superimposed on the translated caption, thus allowing the translated caption to be displayed on display circuit 3, the OSD characters are not provided to the video signal output circuit 30. When OSD characters are to be superimposed on the translated caption, the OSD characters are provided to the video signal output circuit 30. However, when the caption is to be superimposed over the OSD characters which are covering the translated caption, the caption is output to the video signal output circuit 30 through the caption processor 40.

Figure 4:
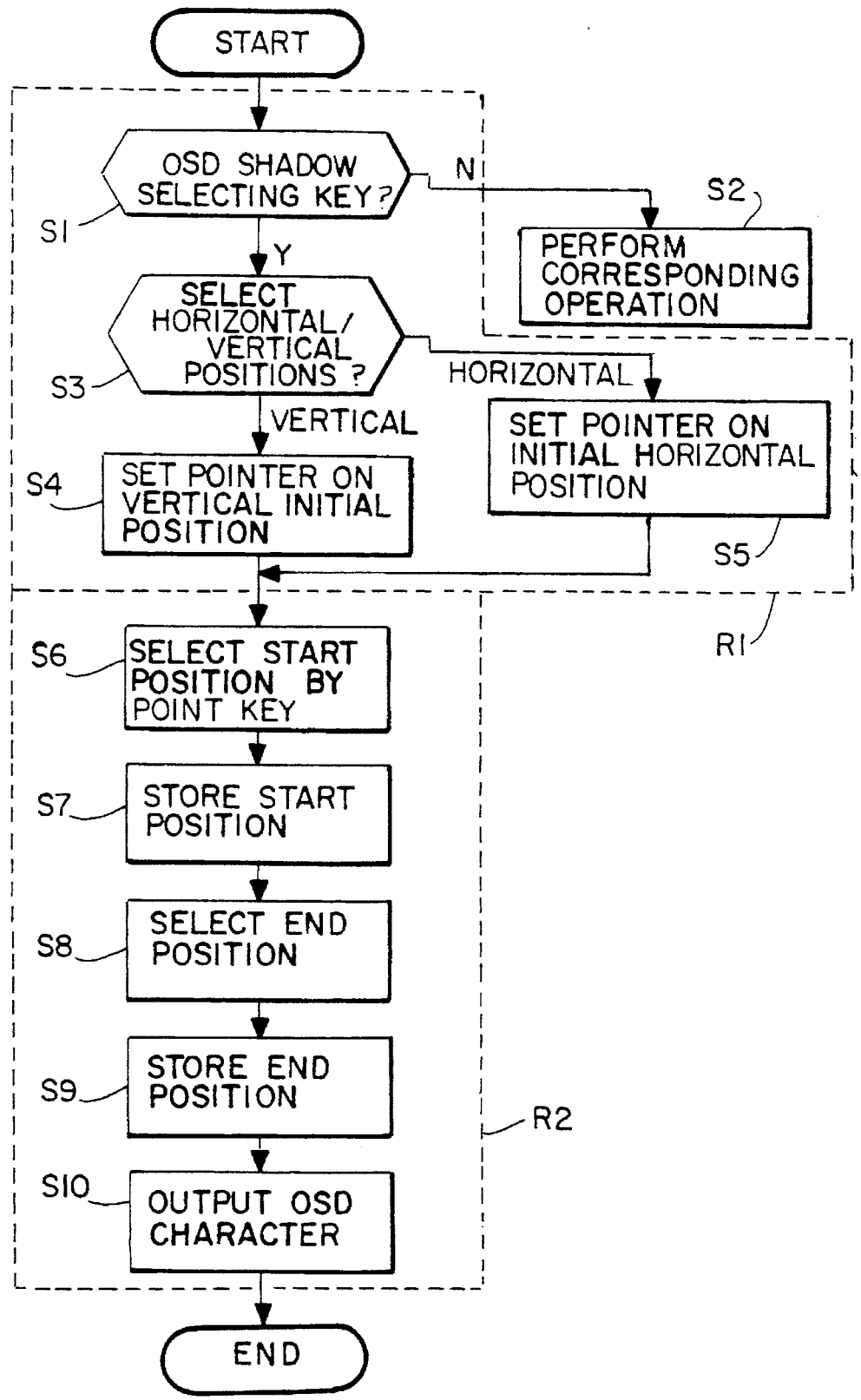
FIG. 4 is a flow chart illustrating the exemplary steps of a method for selectively clearing and revealing a translated caption according to the present invention.

The flow chart of FIG. 4 illustrates a method for selectively covering a translated caption according to the present invention. The method advantageously includes an initial routine R1 and an OSD character output routine R2.

The initial routine R1 begins with step S1 for determining whether an OSD shadow key 10a has been input from the key input circuit 10. If the OSD shadow key 10a has not been operated by a user then, in step S2, an operation corresponding to the actual input key, i.e., some other key, is performed. Otherwise, when the OSD shadow key 10a is operated, the process advances to step S3 where the user makes the determination is made as to whether the translated caption displayed on the screen is displayed horizontally or vertically.

When the translated caption is displayed vertically, the process advances to step S4 for setting a pointer, e.g., using point key 10b, to an initial vertical position, otherwise, the process advances to step S5 for setting the pointer to indicate an initial horizontal position. The process then advances to step S6, which is the first step in the OSD character output routine R2.

In step S6, a start position is selected by the user through the key input circuit by selecting a point key 10b and moving a cursor on the display to a start position. In step S7, the selected start position is stored using a point storing key 10c. Next, in steps S8 and S9, an end position is similarly selected and stored by the user through the selection of the point key 10b and point storing key 10c. Lastly, in step S10, OSD characters are supplied to the video signal output circuit 30 from OSD processor 20 and displayed between the stored start and end positions.

FIGS. 5A to 5C are illustrations which are useful in understanding the method of covering a translated caption as set forth in the flowchart of FIG. 4. Referring to FIG. 5A, a translated caption in a first language is displayed horizontally, together with the cursor or pointer. In FIG. 5B, OSD characters are displayed between the selected start and end positions to thereby cover the translated caption. In FIG. 5C, a caption in a second language is revealed by displaying the caption superimposed on the OSD characters, which, it will be noted, are covering the translated caption. It will be appreciated that this occurs at the same time the user hears the sounds corresponding caption being reproduced from the video tape.

Next, in accordance with the foregoing description, an example of the operation of the apparatus and method of the present invention will now be provided.

During step S1, if the OSD shadow key 10a is operated by the user, a corresponding key input is provided from the key input circuit 10 to the microprocessor 6 so as to place the apparatus in the OSD shadow mode of operation. In step S3, a determination is made as to whether the translated caption displayed on the display 3 is displayed vertically or horizontally. Referring to FIG. 5A, as an example, because the translated caption is displayed horizontally, the process advances to step S5, wherein the pointer is displayed at an initial horizontal position.

Next, in step S6, the start position is selected by the user by selecting the point key 10*b* of the key input circuit 10 and moving the cursor or pointer to a start position. In step S7, the selected start position is stored by operating the point storing key 10*c*. During steps S8 and S9, the user moves the pointer to an end position via point key 10*b* and, after operating the point storing key 10*c*, the end position is stored. It will be appreciated that the start and end points can be stored in microcomputer 6. Finally, the OSD characters are displayed from the stored start position to the stored end position during step S10 whereby the translated caption is covered, as shown in FIG. 5B.

According to the present invention as described above, the translated caption can be covered by OSD characters thereby improving the efficiency of learning a foreign language. In particular, the translated caption can be covered and then revealed as the audio signal, which corresponds to the caption, is reproduced. Alternatively, the translated caption can remain covered as the corresponding audio portion is reproduced. Finally, the translated caption can remain covered and the caption can be displayed, as shown in FIG. 5C, as the corresponding audio portion is reproduced. Thus, the user can better concentrate, and the learning of a foreign language can be improved.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a method of displaying a caption in a video reproducing apparatus comprising a key input circuit containing a plurality of keys including an OSD shadow key and point key, which is selected by a user, a microcomputer coupled to said key input circuit for controlling the apparatus in response to a selected key input, an OSD processor coupled to said microcomputer for processing OSD characters in accordance with a first output of said microcomputer, a caption processor coupled to said microcomputer for generating a caption in accordance with a second output of said microcomputer, a video signal output circuit coupled to said OSD processor and to said caption processor for generating a composite video signal including the OSD characters, an optional caption, and a video signal, and a display for displaying an image corresponding to the composite video signal, said method comprising:

an initial routine comprising the steps of placing the apparatus in an OSD shadow mode by selecting the OSD shadow key of the key input circuit, determining whether a translated caption is displayed horizontally or vertically on the display, and setting a pointer at an initial position corresponding to whether the translated caption is displayed horizontally or vertically; and an OSD character output routine comprising the steps of selecting a start position and an end position using a point key, and displaying OSD characters between the selected start position and end position so as to cover the translated caption.

2. In the method as defined in claim 1, further comprising the steps of selecting a key of the key input circuit, and revealing, in response thereto, the caption so as to display the caption superimposed on the OSD characters.

3. A translated caption covering apparatus for a video reproducing apparatus coupled to an associated display, comprising:

a microcomputer generating first and second control signals;

a video signal source for a video signal including an image, a translated caption, and an audio portion corresponding to said image;

an OSD processor coupled to said microcomputer for generating OSD characters in accordance with said first control signal;

a caption processor coupled to said microcomputer for selectively generating an optional caption in accordance with said second control signal of said lo microcomputer;

a video signal output circuit operatively coupled to said OSD processor and to said caption processor for generating a composite video signal including said OSD characters, said optional caption, and said image;

a display for displaying a display image corresponding to the composite video signal; and means operatively connected to said microcomputer for indicating whether the translated caption is displayed horizontally or vertically on the display and for selecting a start position and an end position on the display corresponding to said translated caption so as to permit covering of said translated caption in said display, wherein said first control signal is generated by said microcomputer responsive to said start and said end positions identified by said indicating means.

4. The translated caption covering apparatus as recited in claim 3, wherein said video reproducing apparatus is a video cassette recorder.

5. The translated caption covering apparatus as recited in claim 3, wherein said video signal output circuit generates said composite video signal from said OSD characters, said caption, and said image signal.

6. The translated caption covering apparatus as recited in claim 5, wherein said microcomputer further comprises means for storing said start and said end positions.

\* \* \* \* \*